(12) United States Patent
Oh et al.

(10) Patent No.: US 7,565,106 B1
(45) Date of Patent: Jul. 21, 2009

(54) WIRELESS SIGNAL REPEATER WITH TEMPERATURE AND TIME DISPLAY

(75) Inventors: Dae-Sik Oh, Overland Park, KS (US); Mark Yarkosky, Overland Park, KS (US); Kristin Hayne, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 531 days.

(21) Appl. No.: 10/704,232

(22) Filed: Nov. 7, 2003

Related U.S. Application Data

(63) Continuation-in-part of application No. 09/842,590, filed on Apr. 26, 2001, now Pat. No. 6,804,526.

(51) Int. Cl.
*H04B 3/36* (2006.01)
*H04B 7/14* (2006.01)
*H04B 1/60* (2006.01)
*H04B 17/02* (2006.01)
*H04B 7/15* (2006.01)
*H04B 7/185* (2006.01)
*H04M 11/00* (2006.01)
*H04W 72/00* (2006.01)
*H04J 3/14* (2006.01)

(52) U.S. Cl. ............... 455/7; 455/9; 455/11.1; 455/452.1; 455/421; 370/241

(58) Field of Classification Search .......... 455/11.1, 455/7, 9, 452.1, 13.4, 25, 421; 370/241
See application file for complete search history.

(56) References Cited

U.S. PATENT DOCUMENTS

| | | | |
|---|---|---|---|
| 4,387,466 A * | 6/1983 | Sire | ............................ 375/214 |
| 4,539,655 A | 9/1985 | Trussell et al. | |
| 4,823,280 A | 4/1989 | Mailandt et al. | |
| 4,945,548 A * | 7/1990 | Iannarone et al. | ........... 375/214 |
| 5,400,246 A * | 3/1995 | Wilson et al. | ................. 700/17 |
| 5,627,834 A | 5/1997 | Han et al. | |
| 5,634,191 A | 5/1997 | Beasley | |
| 5,729,540 A | 3/1998 | Wegrzyn | |

(Continued)

FOREIGN PATENT DOCUMENTS

EP    0 690 639 A2    1/1996

(Continued)

OTHER PUBLICATIONS

Weather Shop, http://web.archive.org/web/20020124072630/http://www.weathershop.com/Icm_ws2210.htm, Jan. 24, 2002.*

(Continued)

*Primary Examiner*—Matthew D Anderson
*Assistant Examiner*—Bobbak Safaipour

(57) ABSTRACT

A wireless signal repeater will function to boost the strength of signals being communicated wirelessly between a base station and a mobile station. At the same time, however, the wireless signal repeater will read control channel messages transmitted by the base station and will obtain from the messages an indication of outside temperature and an indication of local time. The repeater will then display the outside temperature and local time information for viewing by a user. Advantageously, the repeater will thus become a more functional object in the eyes of the average lay-person, rather than functioning merely to boost wireless signal levels.

21 Claims, 6 Drawing Sheets

U.S. PATENT DOCUMENTS

| | | | |
|---|---|---|---|
| 5,767,778 A | 6/1998 | Stone et al. | |
| 5,813,765 A | 9/1998 | Peel et al. | |
| 5,832,365 A * | 11/1998 | Chen et al. | 455/15 |
| 5,850,593 A * | 12/1998 | Uratani | 455/11.1 |
| 5,873,040 A | 2/1999 | Dunn et al. | |
| 5,890,054 A | 3/1999 | Logsdon et al. | |
| 5,901,341 A * | 5/1999 | Moon et al. | 455/9 |
| 5,905,492 A * | 5/1999 | Straub et al. | 715/744 |
| 5,918,154 A * | 6/1999 | Beasley | 455/11.1 |
| 5,937,332 A | 8/1999 | Karabinis | |
| 6,041,124 A | 3/2000 | Sugita | |
| 6,046,674 A | 4/2000 | Irwin et al. | |
| 6,125,275 A * | 9/2000 | Comer et al. | 455/426.1 |
| 6,141,531 A * | 10/2000 | Williams et al. | 455/7 |
| 6,219,540 B1 | 4/2001 | Besharat et al. | |
| 6,246,320 B1 | 6/2001 | Monroe | |
| 6,275,710 B1 | 8/2001 | Oinonen et al. | |
| 6,278,703 B1 | 8/2001 | Meufeld | |
| 6,297,766 B1 | 10/2001 | Koeller | |
| 6,300,871 B1 * | 10/2001 | Irwin et al. | 340/539.28 |
| 6,490,455 B1 | 12/2002 | Park et al. | |
| 6,505,123 B1 | 1/2003 | Root et al. | |
| 6,542,752 B1 | 4/2003 | Illidge | |
| 6,687,487 B1 * | 2/2004 | Mosebrook et al. | 455/11.1 |
| 6,745,021 B1 | 6/2004 | Stevens | |
| 6,751,483 B1 * | 6/2004 | Oh | 455/566 |
| 6,959,196 B1 | 10/2005 | Yarkosky | |
| 2002/0017988 A1 | 2/2002 | Irwin | |
| 2002/0068534 A1 | 6/2002 | Ue et al. | |
| 2002/0073140 A1 | 6/2002 | Chae | |
| 2003/0092442 A1 | 5/2003 | Dalal et al. | |
| 2003/0119460 A1 | 6/2003 | Zipper | |

FOREIGN PATENT DOCUMENTS

EP          0 690 639 A3 *    1/1997

OTHER PUBLICATIONS www.archive.org, Jan. 24, 2002.*
U.S. Appl. No. 09/842,590, filed Apr. 26, 2001 entitled "Method and System for Reporting Outside Temperature".
Office Action from U.S. Appl. No. 09/842,590, dated Oct. 10, 2003.
Office Action from U.S. Appl. No. 09/842,590, dated Apr. 8, 2004.
Office Action from U.S. Appl. No. 10/097,415, dated Jun. 21, 2004.
Office Action from U.S. Appl. No. 10/097,415, dated Jan. 25, 2005.
Mobile Media Japan: Location-based weather forecast service, http://www.mobilemediajapan.com/newsdesk/locationweather, printed from the World Wide Web on Apr. 26, 2001.
GeePS Introduces Location-Based Wireless Technologies on Advance Internet's New Jersey Online for Retailers and Consumers, http://www.mobileoffice.co.za/news_2000/news-06192000_new_jersey_location_services.htm, printed from the World Wide Web on Apr. 26, 2001.
Location-Based Technology Pushes the Edge—Jun. 2000, http://www.telecoms-mag.com/issues/200006/tsc/location.html, printed from the World Wide Web on Apr. 26, 2001.
Proposal to ITU for G3-RTT, "TD-SCDMA Radio Transmission Technology for IMT-2000 Candidate submission—Draft V.0.4," Sep. 23, 1998.

* cited by examiner

WIRELESS SIGNAL REPEATER WITH TEMPERATURE AND TIME DISPLAY

REFERENCE TO RELATED APPLICATIONS

This is a continuation-in-part of U.S. patent application Ser. No. 09/842,590, filed Apr. 26, 2001, the entirety of which is hereby incorporated by reference.

BACKGROUND

1. Field of the Invention

The present invention relates to wireless communications and, more particularly, to wireless signal repeaters. Such repeaters can be usefully employed to enhance wireless communications of various types. For purposes of example, this description will focus mainly on cellular wireless communications, such as CDMA communications for instance.

2. Description of Related Art

Cellular wireless is an increasingly popular means of personal communication in the modern world. People are using cellular wireless networks for the exchange of voice and data over cellular telephones, personal digital assistants (PDAs), cellular telephone modems, and other devices. In principle, a user can seek information over the Internet or call anyone over a public switched telephone network (PSTN) from any place inside the coverage area of the cellular wireless network.

In a typical cellular wireless system, an area is divided geographically into a number of cell sites, each defined by a radio frequency (RF) radiation pattern from a respective base station antenna. The base station antennae in the cells are in turn coupled to a base station controller, which is then coupled to a telecommunications switch (e.g., mobile switching center) or other gateway (e.g., packet data serving node) that provides connectivity with a transport network such as the PSTN or the Internet.

When a mobile station (such as a cellular telephone, pager, or appropriately equipped portable computer, for instance) is positioned in a cell, the mobile station communicates via an RF air interface with the BS antenna of the cell. This air interface communication can occur over control and traffic channels as defined by an accepted protocol. Communications from the base station to a mobile station are considered to be in a "forward" direction, so the air interface channels used to carry such communications are referred to as the "forward link" channels. Conversely, communications from a mobile station to the base station are considered to be in a "reverse" direction, so the air interface channels used to carry such communications are referred to as "reverse link" channels.

For instance, in a Code Division Multiple Access (CDMA) system operating according to industry standard IS-2000 (now commonly known as "cdma2000"), up to 64 communication channels exist on the forward link, each distinguished by a unique "Walsh code." The control channels include a pilot channel defined by Walsh code 0, a synch channel defined by Walsh code 32, and a number of paging channels defined by Walsh codes 1 through 7, as necessary. The traffic channels, in turn, are defined by the remaining Walsh codes (up to 62 in total).

Further, in a CDMA system, each physical sector in a cell is distinguished by a PN offset, which defines a sector-specific part of a pseudo-random number. Communications between a mobile station and the base station on a given channel, in a given sector, and on a given carrier frequency, are encoded using the Walsh code of the channel and the PN offset of the sector and are then carried on the carrier frequency. A receiving entity can then extract particular channels from the air interface by employing a "rake receiver" that scans through air interface signals in search of signals that are encoded with particular combinations of PN offset and Walsh code.

Under cdma2000, the pilot channel is used for establishing signal timing and conveying signal strength measurements to facilitate handoff between sectors. The pilot channel does not carry messages but rather provides a stream that mobile stations can frequently sample to determine how well they can hear a base station. A mobile station will measure the pilot when it initializes and regularly while it's powered up, whether idle or in a call, in search of the strongest sector.

The synch channel, on the other hand, is used to convey system identification and other system-specific information to mobile stations, generally to allow mobile stations to establish communication in the sector. For this reason, the synch channel carries one message, the synch channel message, which contains information such as the system time, code and frame timing, an indication of the PN offset for the sector sending the message, and a system ID number. When a mobile station first powers-on in a CDMA system, it will search for the strongest pilot and then check the synch channel to find out what PN offset it is using to communicate with the base station.

A paging channel, in turn, may be used to page a mobile station in order to determine whether the mobile station is available to receive a call. Further the paging channel(s) may carry system information and call setup orders to facilitate establishment of calls with the mobile station. For instance, the base station may send a general page message over a paging channel, which can direct a mobile station to switch to a designated traffic channel and to alert a user of an incoming call. Once a mobile station finds a pilot and checks the synch channel, the mobile will quickly switch to the paging channel to be able to receive calls.

With the continued growth in popularity of wireless communications, people are increasingly engaging in cellular wireless communications in place of traditional landline communications. This is of course most notable within buildings, such as homes and offices, where landline communications, such as traditional telephone and computer networks, were once the only method available. Use of mobile stations instead of fixed landline terminals conveniently allows for free movement within such buildings as well as into and out of the buildings.

Unfortunately, however, cellular wireless communications can suffer from varying levels of signal degradation as signals are carried over the air interface between the mobile station and the base station. Most significantly, for instance, the strength of signals transmitted in the forward link direction from the base station to the mobile station can diminish substantially as the signals travel over increased distance to the mobile station. Further, obstructions such as buildings and foliage can attenuate or otherwise degrade signals passing over the air interface.

When a mobile station operates within a building, the problem can be even more acute, as the structure of the building can further diminish the signal. In a worst case scenario, forward link signals that ultimately arrive at a mobile station within a building may be too weak to be detected and/or used by the mobile station. As a result, service could be unavailable and wireless communications could be blocked or dropped. This is clearly a problem for cellular wireless carriers who are seeking to promote in-building use of their service.

One approach that can be used to overcome this difficulty is to increase the power transmitted by the base station. A disadvantage with this approach, however, is that the increased power can lead to increased interference in adjacent cells. This, in turn, can decrease the capacity of the wireless network. The power increase can also interfere with other wireless devices in use around the base station. The magnitude of the power increase proportionally affects the amount of interference produced by the base station, with a greater power increase causing a greater interference.

Also, this approach would only solve half of the problem. Increasing the signal strength from the base station would allow a mobile unit to receive the base station's signal in areas that highly attenuate that signal. It would not aid the base station in receiving a signal from a mobile station. Cellular service is primarily a bi-directional mode of communication, in which connections are established and maintained through control signals that are sent both directions between the base station and a mobile station. Therefore, in order to support bi-directional communication, an increase in the transmission power of the base station would usually require a corresponding increase in the transmission power of the mobile station.

Another approach to help increase wireless signal strength within a building is to provide a wireless signal repeater to receive, boost and re-transmit communication signals that are being sent between a base station and a mobile station (or, for that matter, between any sort of wireless access point and a mobile station). In this regard, the wireless signal repeater can operate simultaneously to boost signals on both the forward link and the reverse link. Conveniently, the wireless signal repeater can be positioned within a building so as to boost signals for a mobile station operating within the building.

SUMMARY

The present invention leverages the ability of a wireless repeater within a building to receive signals from a wireless communication network and particularly from a cellular base station. According to the invention, in addition to boosting signals that travel between a base station and a mobile station, an exemplary wireless repeater will be arranged to receive and display regional information, such as outside temperature and local time (i.e., time, day and/or date), broadcast from the base station.

Advantageously, the repeater can thereby become more of a functional object in the user's perspective, rather than just functioning to improve wireless communication. For instance, a user could prominently position the repeater on an end-table or hang the repeater on a wall as a decorative ornament so that people in the room can easily look at the repeater to see the outside temperature and local time.

An exemplary embodiment of the invention could take various forms. In one respect, for instance, the exemplary embodiment could take the form of an apparatus that is arranged to (i) wirelessly receive, amplify, and wirelessly transmit a signal, (ii) extract regional information from the signal, and (iii) present the regional information to a user. Preferably, the regional information would include an indication of outside temperature, which could be measured at a local cell tower. Further, the regional information could include an indication of local time. The apparatus could present the indication of outside temperature together with the indication of local time. Additionally, the apparatus could present an indication of signal level (e.g., input, output and/or amplification level) concurrently as well.

The apparatus could present the outside temperature, local time and signal-level in various ways. In a preferred embodiment, for instance, the apparatus could display the information on an integrated display screen, so that a person can see the information by looking at the display screen. Alternatively, the apparatus could play the information through an audio output mechanism such as a loudspeaker (integrated or connected externally), so that a person can hear the information. Further, the apparatus could include a bracket, hook or other mechanism that allows the apparatus to be prominently mounted on a surface such as a wall.

In another respect, an exemplary embodiment of the invention could take the form of a wireless signal repeater that is arranged to display outside temperature. The repeater could include an input circuit that wirelessly receives a signal, a build-out circuit that amplifies the signal, and an output circuit that wirelessly transmits the signal once amplified. Further, the repeater could include a cellular receiver that extracts a control channel from the signal, and logic that reads from the control channel an indication of outside temperature and that causes the outside temperature to be presented on an integrated display screen for viewing by a user. Still further, the logic could read an indication of local time from the control channel and could cause the local time to be presented on the display screen, possibly together with the outside temperature.

In the exemplary embodiment, the signal that the repeater receives will originate wirelessly from a cellular base station. That is, the cellular base station will send the signal wirelessly to the repeater (possibly through one or more intermediate elements). Further, the cellular receiver of the repeater can include a rake receiver of the type commonly used to read various channels from a spread-spectrum signal such as a CDMA signal.

In yet another respect, the exemplary embodiment can take the form of a method of reporting outside temperature. The exemplary method could involve establishing a digital representation of an outside temperature for a cell site served by a base station, inserting the digital representation as a predetermined parameter in a control channel message, and broadcasting the control channel message from the base station. In turn, the method could involve receiving the control channel message at a wireless signal repeater, and executing logic in the wireless signal repeater to read the digital representation of the outside temperature from the predetermined parameter in the control channel message and to display the outside temperature indicated by the digital representation.

Preferably, the step of establishing the digital representation of the outside temperature for the cell site served by the base station would involve operating a temperature source at the base station to measure the outside temperature at the base station. By way of example, the temperature source could comprise a platinum resistance temperature detector, which could be mounted on an antenna tower of the base station, so that the temperature that it reads is the outside temperature at the base station.

These as well as other aspects and advantages will become apparent to those of ordinary skill in the art by reading the following detailed description, with reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Wireless Network

Figure 1:
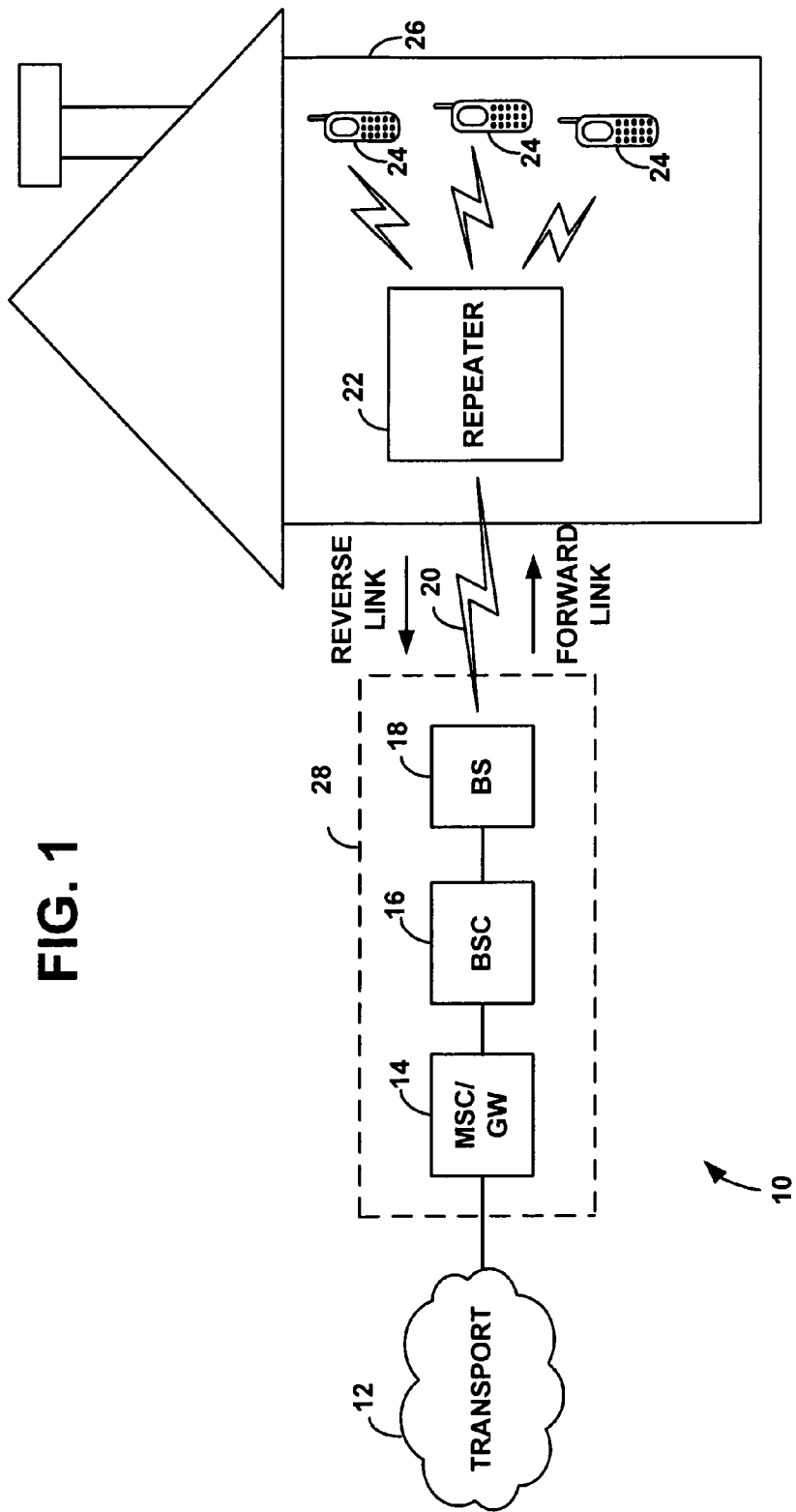
FIG. 1 is a block diagram of a wireless telecommunications network in which the exemplary embodiment can be employed.

Referring to the drawings, FIG. 1 illustrates a wireless telecommunications network 10 in which an exemplary embodiment of the invention can be employed. Network 10 includes a transport network 12 (e.g., the public switched telephone network (PSTN), or the Internet), a mobile switching center (MSC) or other gateway 14, a base station controller (BSC) 16, a base station 18, an air interface 20, a wireless signal repeater 22 and mobile stations 24. In the exemplary embodiment, both repeater 22 and mobile stations 24 are located within a building 26, such as a house or office building, but they could be located elsewhere.

Elements 14-18 are considered to be a "radio access network" 28 and are usually owned and operated by a telecommunications service provider. The radio access network 28 functions to interconnect mobile stations 24 with the transport network 12. For instance, when a call for a mobile station comes in from the transport network, MSC 14 may signal to BSC 16, which may send a signaling message via base station 18 and over air interface 20 to the mobile station in an effort to set up and connect the call. Similarly, when a mobile station places a call to an entity on the transport network, the mobile station may signal over the air interface 20 and via base station 18 and BSC 16 to MSC 14, and MSC 14 may then set up and connect the call via the transport network.

It should be understood that the elements depicted in FIG. 1 and in other figures are shown for purposes of example only. Variations are possible. For instance, although FIG. 1 depicts only a single base station 18, radio access network 28 could include multiple base stations, some of which could be controlled by a common BSC 16. Further, although FIG. 1 depicts only a single BSC 16, radio access network 28 could include multiple BSCs 16, some of which could be controlled by a common MSC 14. Still further, although FIG. 1 depicts base station 18 as a distinct block in radio access network 28, it should be understood that the base station could be co-located or integrated with the BSC 16 and/or MSC 14.

As noted above, base station 18 may communicate with mobile stations 24 in various channels over air interface 20. For example, according to cdma2000, the base station will continuously broadcast a pilot signal on the pilot channel (Walsh code 0). Additionally, the base station will continuously broadcast a synch channel message on the synch channel (Walsh code 32). And when a mobile station is actively engaged in a call, the mobile station will communicate with the base station over a designated traffic channel (any of the remaining Walsh codes).

As further indicated above, when a mobile station is first powered up, it will search for the strongest pilot channel and may responsively establish communication with a base station, such as base station 18. According to cdma2000, the mobile station will then enter a "synch channel acquisition substate," in which the mobile station will receive and process a sync channel message. The mobile station will then enter a "mobile station idle state," in which the mobile station will monitor the paging channel(s), receiving and processing paging channel messages.

2. Exemplary Wireless Repeater

In the exemplary embodiment, repeater 22 functions to boost wireless communications between base station 18 and mobile stations 24. Preferably, repeater 22 is a bi-directional repeater, in that it boosts communications on both the forward link (from the base station to the mobile stations) and the reverse link (from the mobile stations to the base station). However, at a minimum, the repeater 22 receives signals in the forward link, amplifies those signals, and outputs the amplified signals for receipt by the mobile stations 24.

Figure 2:
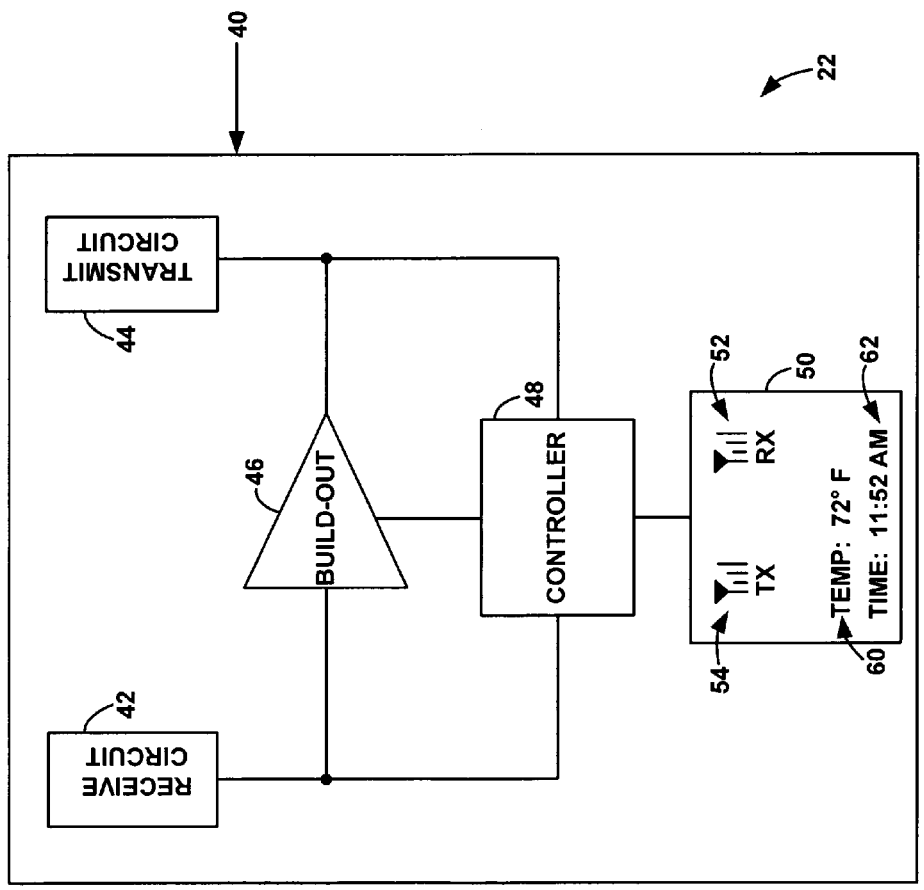
FIG. 2 is a simplified block diagram of an exemplary wireless signal repeater.

FIG. 2 is a simplified block diagram illustrating components of a wireless signal repeater 22 made in accordance with the exemplary embodiment. As shown in FIG. 2, repeater 22 preferably has an outer housing or case 40 in or on which various components are located. Illustrated within housing 40 are a receive circuit 42, a transmit circuit 44, a build-out circuit 46, a controller 48, and a display screen 50. In the arrangement shown, receive circuit 42 is coupled with an input of build-out circuit 46 and with controller 48, and transmit circuit 44 is coupled with an output of build-out circuit 46 and with controller 48. In addition, controller 48 is coupled with display screen 50.

Each of these components can take various forms. Therefore, particular descriptions of these components in this specification should be viewed as examples only. Further, the arrangement and functions of these components can vary, additional components could be added, and the functions of various components can be combined if desired. For instance, although only a single display screen 50 is shown, repeater 22 could include multiple display screens, which could operate cooperatively or separately.

In the exemplary embodiment, receive circuit 42, transmit circuit 44, build-out circuit 46 and controller 48 are all completely internal to housing 40. Display screen 50 may also be internal to housing 40 but preferably faces out from an outer surface of housing 40, so as to allow a user to view indications that are displayed on the screen.

Generally speaking, receive circuit 42 preferably comprises a receive antenna suitable for receiving wireless signals of a desired frequency or other character. And transmit circuit 44 preferably comprises a transmit antenna suitable for transmitting amplified wireless signals of the same frequency or character. Although these circuits are shown completely internal to housing 40 (preferably abutting the surface of the housing), their respective antennas can additionally or alternatively extend outside of the housing if desired. In this regard, for instance, the repeater could include external antenna ports to facilitate connection with external antennas. Suitable antennas may include flat planar patch antennas and/or dipole antennas.

Build-out circuit 46, in turn, is preferably a variable gain amplifier, which can be set to amplify input signals (from receive circuit 42) to a desired extent, so as to produce output signals (for transmission by transmit circuit 44). As such, the build-out circuit may be configurable to provide a gain ranging from a minimum gain to a maximum gain.

Display screen 50 could be an LED or LCD display panel or other display mechanism that is capable of presenting information to a user. In accordance with the exemplary embodiment, the information may comprise (i) signal-level information and (ii) regional information. In particular, the signal-level information could include an indication of receive signal level 52 and an indication of transmit signal level 54, measured on the forward link for instance. And the regional information could include an indication of outside temperature 60 and an indication of local time 62. The regional information and signal-level information could take other forms as well.

Controller 48 may also take various forms. For instance, controller 48 may comprise one or more processing elements including or interconnected with one or more data storage components. The processing elements could comprise one or more programmed general-purpose processors and/or one or more special-purpose processors such as DSPs, ASICs, etc., and the data storage could comprise volatile and/or non-volatile memory (e.g., flash memory). The controller would likely further include or be interconnected with analog-to-digital conversion circuitry that provides a digitized version of the signal passing through the repeater and provides an analog version of the signal for output. The processing elements can then operate on the signal in analog and/or digital form.

In accordance with the exemplary embodiment, controller 48 carries out both (i) repeater-specific functions and (ii) regional-information reporting functions. By way of example, the repeater-specific functions could include monitoring input and output signal strength and adjusting amplification levels so as to optimally boost the level of signals being exchanged between base station 18 and mobile stations 24. And the regional-information reporting functions could include extracting regional information from a forward link signal and causing the regional information to be presented on the display screen for viewing by a user.

As presently contemplated, the repeater 22 will receive regional information within one or more control channel messages transmitted from radio access network 28. For instance, the regional information could be carried within predefined fields on the pilot channel, synch channel and/or paging channel transmitted from the base station 18. Controller 48 will then include logic to read the control channel message(s) so as to uncover the regional information.

In this regard, control channel communications transmitted from radio access network 28 are generally intended for receipt by mobile stations 24, and each mobile station is configured to receive and read control channel communications. As noted above, for example, each mobile station in a CDMA system may include a rake receiver that scans through air interface signals so as to hone in on particular control channels, and each mobile station may then be arranged to read particular control channel messages. Such rake receivers and associated logic are commonly available in the MSM™ series of CDMA chipsets made by Qualcomm Incorporated for instance.

In accordance with the exemplary embodiment, the controller 48 in repeater 40 will be similarly equipped to receive and read control channel messages on air interface 20. For instance, controller 48 could include a Qualcomm MSM™ chipset that has a rake receiver and associated logic so as to decode particular control channels on the forward link. And controller 48 may be arranged to read one or more messages on the control channels, to as to obtain regional information such as outside temperature and local time.

Figure 3:
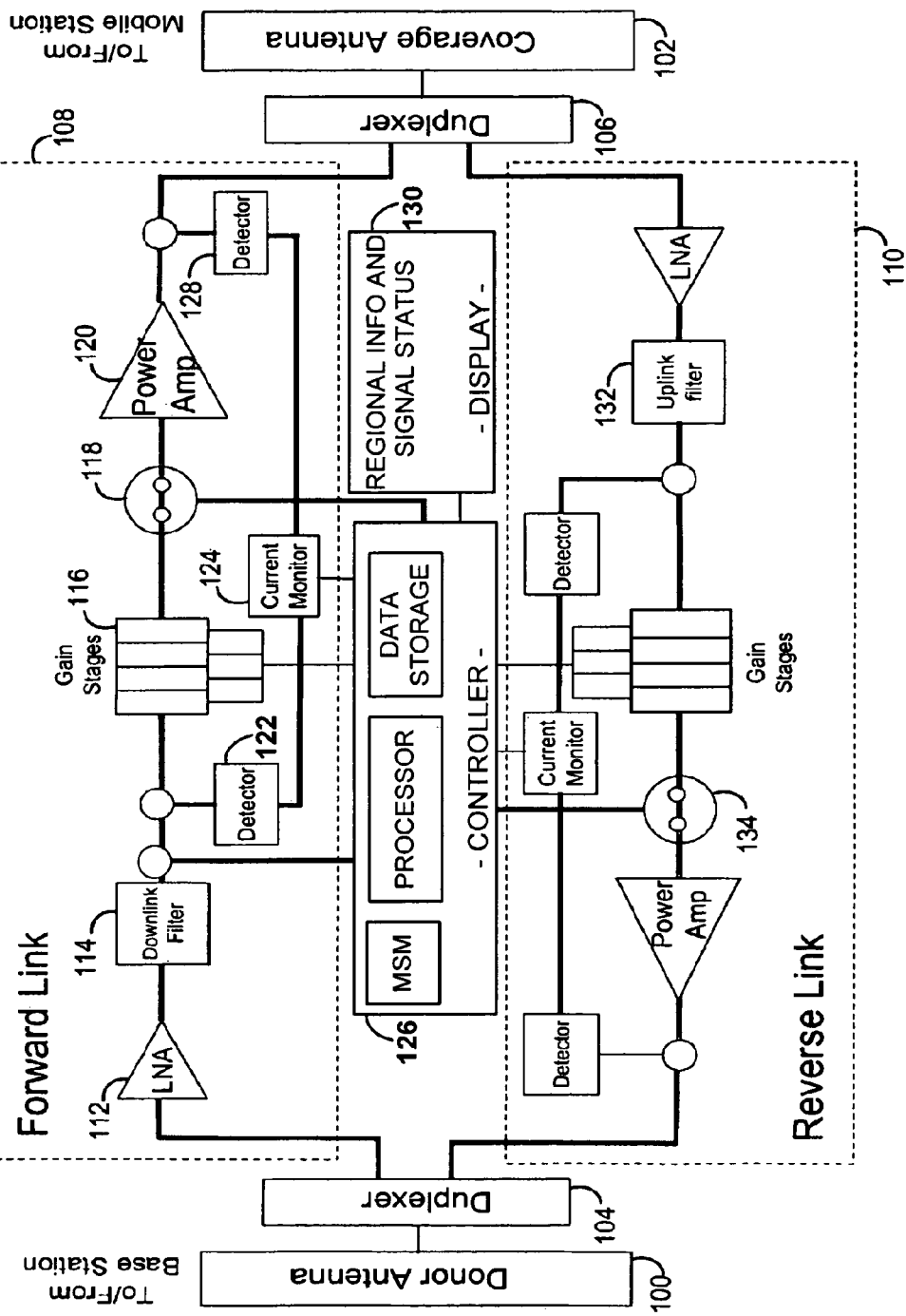
FIG. 3 is a more detailed schematic of an exemplary wireless signal repeater.

Referring next to FIG. 3, a schematic of an exemplary repeater 22 is shown, to illustrate in more detail how the repeater could be arranged to function in accordance with the exemplary embodiment. Although a housing is not shown in FIG. 3, it should be understood that the components shown in FIG. 3 will preferably reside in a single housing as described above. An exemplary housing can be made of a rugged molded plastic and can be sized and designed with ornamental features suitable for presentation within a house or other building.

The exemplary arrangement shown in FIG. 3 depicts a donor antenna 100 for communicating signals with the base station, and a coverage antenna 102 for communicating signals with the mobile station. The repeater may then include duplexors 104, 106 for concurrently handling transmit and receive signals on each antenna. The repeater may then process forward link signals separately in a forward link block 108, and reverse link signals separately in a reverse link block 110.

In the exemplary embodiment, on the forward link, the donor antenna 100 will receive an RF signal, which will then pass through duplexor 104 to a low noise amplifier (LNA) 112. From LNA 112, the signal will then pass to a downlink (forward link) block filter 114, which functions to pass only a predefined part of the signal. For cellular wireless communications in the PCS bands, the filter could pass a frequency range such as about 1930 to 1990 MHz or about 1840 to 1870 MHz, though other examples are possible as well.

Substantially all of the output from the downlink filter then passes to a gain stage circuit 116 that is made up of a number of gain stages, each of which can be selectively applied to increase the signal. From the gain stage circuit, the signal then passes through a switch 118 to a power amplifier 120, which amplifies the signal. In turn, substantially all of the amplified signal then passes via duplexor 106 to the coverage antenna 102, which transmits an RF output signal to the mobile station.

In the arrangement shown, a portion of the output from downlink filter 114 passes through a coupler to controller 126, so that controller can decode control-channel messages and obtain regional information for presentation to users. Further, a portion of the output from downlink filter 114 also passes through a coupler to a detector 122, which provides an RMS voltage reading to a current monitor 124. And the current monitor 124 then reads the current of the signal and passes the current reading to a controller 126, reflecting the input signal strength. Additionally, a portion of the output from power amplifier 120 passes through a coupler to a detector 128, which provides an RMS voltage reading to current monitor 124. And current monitor 124 then reads the current of that signal and feeds the current reading to controller 126, reflecting the output signal strength. Alternatively, note that separate current monitors could be provided for monitoring input and output signal strength.

The controller 126 is also coupled with gain stage circuit 116, so as to control the number of gain stages that are in effect at any given time. For example, when the controller determines that the output signal strength exceeds a predefined oscillation threshold, indicative of feedback oscillation, the controller may incrementally reduce the amount of gain applied by the gain stage circuit 116, in an effort to eliminate that oscillation.

Further, the controller 126 is coupled with switch 118 so as to selectively prevent delivery of forward link signals to amplifier 120. For example, when the controller determines that the input signal strength is lower than a predefined threshold, indicating absence of any meaningful input signal, the controller may open switch 118 so as to prevent unnecessary signal amplification and output on the forward link. As another example, if the controller determines that the input signal strength is too high (which could damage the repeater) or that the output signal strength is too high (which could reflect feedback oscillation), the controller could similarly open switch 118.

Still further, the controller 126 is coupled with an LCD display screen 130, so as to facilitate display of regional information and signal-level information. For example, controller 126 could send display instructions to display 130 to cause the display to present certain graphics or text representing outside temperature, local time, input signal level, and output signal level.

Controller 126 is shown to include an MSM™ chipset, a processor, and data storage. In accordance with the exemplary embodiment, the MSM™ chipset includes a rake receiver, which functions in a well known manner to decode downlink signals, so as to hone in on one or more control channels, such as the pilot channel, synch channel and/or paging channel. The exemplary processor then executes machine language instructions stored in the data storage, so as to carry out various functions described herein.

For example, the processor may receive a decoded control channel data stream or control channel message from the MSM™ chipset, and the processor may read the control channel message so as to obtain regional information such as outside temperature and local time. The controller may then cause that regional information to be presented on display screen 130, refreshing the information periodically or continuously as desired.

As another example, the processor may cause indications of the input signal strength and output signal strength to be presented on the display screen 130, perhaps together with the regional information. Further, as another example, the processor could monitor the input and output signal strengths and adjust the state of gain stage circuit 116 and/or switch 118 accordingly. Other examples are possible as well.

In the exemplary embodiment, the reverse link block 110 of the repeater 22 may operate in largely the same manner as the forward link block 108, so it is not described in full here. One notable distinction is that the repeater need not monitor control channels on the reverse link, since the exemplary control channel messages will be on the forward link rather than on the reverse link. Another notable distinction is that the reverse link block 110 includes an uplink (reverse link) block filter 132, rather than a downlink block filter. The uplink block filter functions to pass only a predefined part of the reverse link input signal. For cellular wireless communications in the PCS bands, the uplink filter could pass a frequency range such as about 1850 to 1910 MHz or about 1750 to 1780 MHz. However, other example ranges are also possible.

Further, although not shown in FIGS. 2 and 3, repeater 22 would include an internal battery and/or an AC power connection for plugging into a standard power outlet, so as to facilitate operation of the repeater.

3. Regional-Information Reporting System

Figure 4:
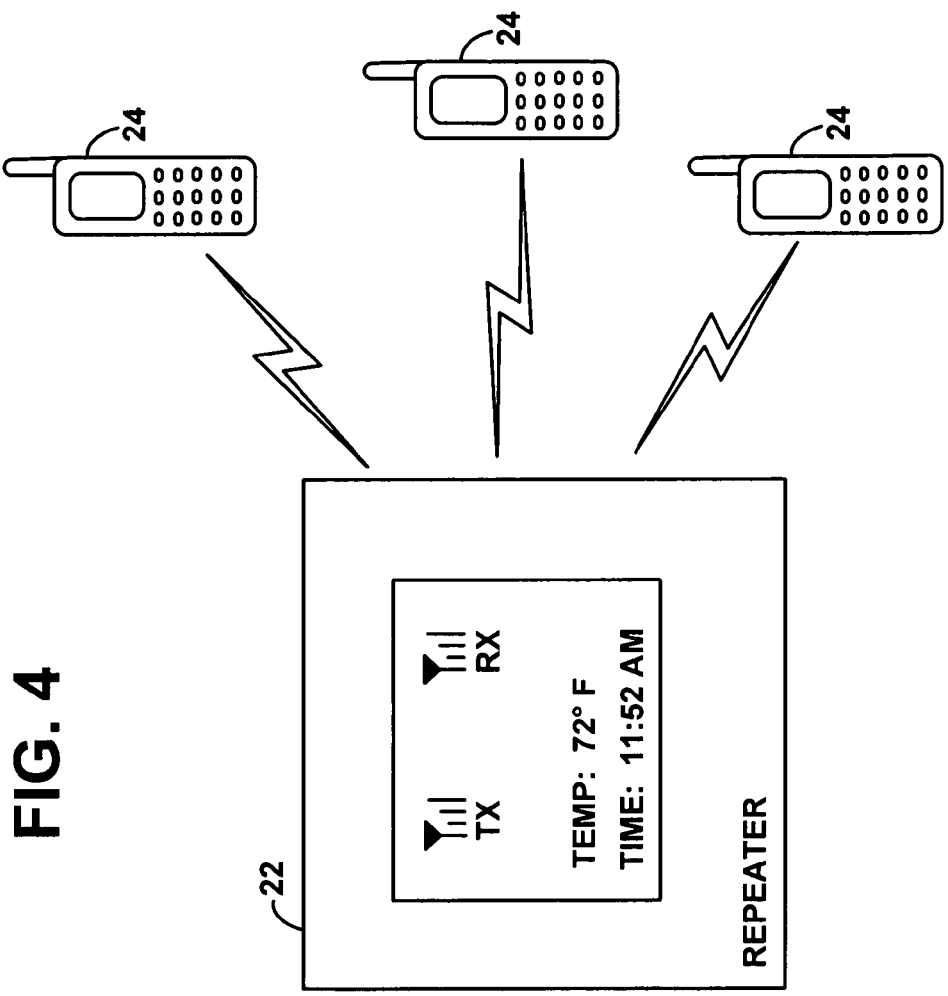
FIG. 4 is a block diagram depicting functional operation of a system in accordance with the exemplary embodiment.

In accordance with the exemplary embodiment, radio access network 28 will broadcast regional information, such as outside temperature and local time, in one or more control channel messages for receipt by devices in the coverage area of the network, such as devices operating within the coverage area of base station 18. One such device may be repeater 22, although other devices, such as mobile stations 24 for instance, may also receive the control channel messages independently or via repeater 22. FIG. 4 is a simplified block diagram illustrating the functional operation of a regional-information reporting system in accordance with the exemplary embodiment.

As shown in FIG. 4, base station 18 broadcasts outside temperature and local time information in one or more control channel messages over air interface 20. Repeater 22 receives the control channel messages, extracts the temperature and time information, and displays the temperature and time information. Conveniently, the repeater 22 can thereby function not only as a repeater but also as a clock and/or temperature reporting station.

Radio access network 28 may obtain and report regional information in various ways, depending on the type of information. The following two subsections will discuss local time and outside temperature information by way of example.

a. Reporting Local Time

It is known to broadcast local time information from a cellular base station to mobile stations such as cellular phones. For instance, cdma2000 defines the synch channel message to include certain parameters, including a system time (tied to GPS time), a local time offset for use in setting a local clock, and a daylight savings time indicator. Normally, when a cellular phone receives the synch message, the cellular phone reads the system time, adjusts it according to the local time offset and/or daylight savings time indicator, and displays the time of day for a user to see.

In accordance with the exemplary embodiment, repeater 22 may carry out this function as well. In particular, controller 126 may read the synch channel message to determine the local time. And the controller may then cause that local time to be presented on display 130. Further, the controller may carry out this function periodically to receive updated reports of local time and to continually display a reading of the local time.

b. Reporting Outside Temperature

Radio access network 28 may obtain a reading of the current outside temperature from any suitably positioned temperature source. In the exemplary embodiment, the temperature source could be a simple weather gauge, such as a platinum resistance temperature detector (RTD) or a thermocouple, which provides an output voltage indicative of current temperature. Example platinum RTDs are readily available from companies such as Minco Products, Inc., of Minneapolis, Minn., or Rosemount Inc., of Chanhassen, Minn. Alternatively, the temperature source can be more complex, such as a digital thermometer that outputs a bit sequence indicative of temperature.

Ideally, the temperature source will be positioned in a location that allows it to provide an accurate read of the outside temperature in the coverage area of base station 18. That way, the outside temperature that the base station broadcasts and that repeater 22 receives and displays will be a locally relevant indication of outside temperature.

An optimal location for the temperature source would be at the base station tower itself, since the base station tower sits at the core of its coverage area and could thus provide a centralized reading of outside temperature for the coverage area. However, the temperature source could reside at other locations, such as at another entity of radio access network 28 for instance.

Figure 5:
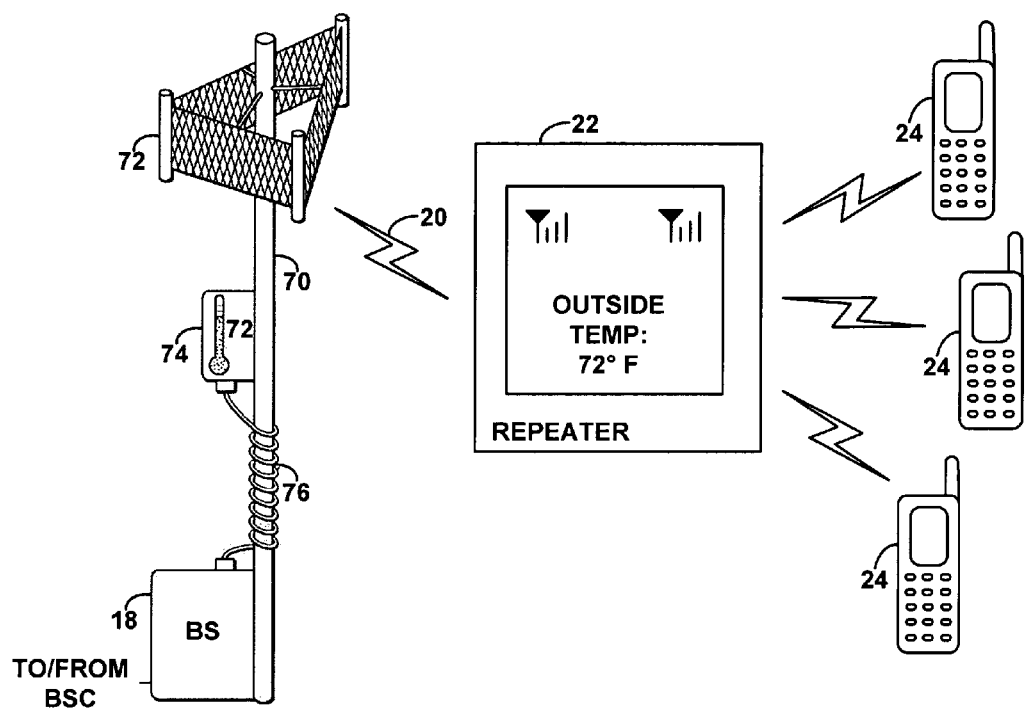
FIG. 5 is an illustration of a base station receiving a measure of outside temperature and reporting the temperature to the exemplary repeater.

By way of example, FIG. 5 illustrates an arrangement in which the temperature source is located at the base station itself. In particular, FIG. 5 shows that base station 18 includes a base station antenna tower 70 supporting a base station antenna 72 (shown as three directional antennas). Mounted to the antenna tower 70 is a temperature gauge 74, such as a platinum RTD (shown fancifully as a mercury thermometer). The temperature gauge is then coupled by a wire 76 extending down the antenna tower to base station equipment. Antenna 74 is in turn shown to be to be in communication via an air interface with repeater 22, which amplifies forward link signals and outputs the signals for receipt by mobile stations 24.

In operation, temperature gauge 74 will continually measure the outside temperature at the base station and will continually provide an indication of the outside temperature to the base station, via wire 76. If temperature gauge 74 is a platinum RTD, as indicated above, it will provide an output voltage indicative of the temperature.

Base station 18 may then sample the voltage and produce a digital signal (a bit sequence) representative of the temperature. In turn, base station 18 may insert the digital temperature indication as a parameter in a control channel message and broadcast the message over air interface 20 to devices such as repeater 22. Alternatively, base station 18 could report the outside temperature via a wired or wireless communication link to BSC 16, and BSC 16 could then insert the temperature as a parameter in a control channel message that BSC 16 then sends to base station 18 to be broadcast over air interface 20.

In the exemplary embodiment, the base station 18 could include software, firmware and/or hardware to carry out these functions. For instance, the base station could include an analog-to-digital converter for sampling the temperature indication signal provided by the temperature gauge 74, so as to produce a digital representation of the current temperature. And the base station may include a processor that receives the digital temperature representation and inserts the digital temperature representation into a control channel message as a predefined temperature parameter, or that sends the digital representation via a communication link to BSC 16.

It is possible that the base station may have already generated or received (e.g., from the BSC) the control channel message without the temperature parameter. In that case, the base station processor could insert the temperature parameter into the established message. Alternatively, the base station processor may function to establish the entire control channel message, including the temperature parameter. Once the entire control channel message is established, or as the control channel message is being established, the base station can send the control channel message to antenna 72 for broadcast of the message over air interface 20.

Various control channels and control channel messages can be used to carry the outside temperature indication over air interface 20 to repeater 22. Applying cdma2000 for example, two such channels are the synch channel and the paging channel as described above. Within the synch channel, cdma2000 defines the synch channel message. Within the paging channel, an exemplary message defined by cdma2000 is known as the "Feature Notification Message." According to the exemplary embodiment, the base station can continually broadcast the temperature indication in both of these messages.

As noted above, cdma2000 defines the synch channel message to include certain parameters. In accordance with the exemplary embodiment, the synch channel message would be extended to include a predefined temperature parameter, which can carry an indication of temperature as an ASCII character string (such as a number, a degree symbol, and a letter indicating the temperature scale (e.g., "65° F.")). A suitably programmed controller in repeater 22 can then read the temperature parameter, extract the ASCII character string representation of temperature, and display the character string on a display for viewing by a user.

cdma2000 in turn defines the Feature Notification Message to include an 8-bit "Record_Type" parameter, an 8-bit "Record_Length" parameter, and a variable length parameter for carrying type-specific information (in blocks of 8-bits). According to cdma2000, one of the record-types is "Display" (RECORD_TYPE=00000001), which cdma2000 defines as a record that allows the network to supply display information that may be displayed by the MS. The TYPE-SPECIFIC field can have one or more occurrences of a field called CHARi (8 bits), which is an ASCII representation of a character to be displayed.

According to the exemplary embodiment, the base station can use this message to carry an ASCII representation of the temperature, in a format such as that described above for instance. Further, the base station can continually or periodically send this message over the paging channel. Repeater 22 can then extract the ASCII temperature from the message and continually display the temperature, until it receives an updated ASCII temperature in a subsequent control channel message.

Another record-type defined by cdma2000 for the Feature Notification Message is "Extended Display," which may in fact be more suitable than the "Display" type, for broadcasting a temperature indication. The Extended Display type defines fields for (i) an indication of the type of display, (ii) a tag indicating the type of display information, (iii) the length of the display text, and (iv) the display information as a sequence of ASCII characters. cdma2000 defines a limited set of 8-bit tags to indicate the type of display information.

In accordance with the exemplary embodiment, another 8-bit tag can be established to indicate temperature display information. The base station can therefore use this record-type to carry an ASCII representation of the temperature, associated with a temperature tag. And repeater 22 can be programmed to detect the temperature tag, extract the associated ASCII temperature, and continually display it, again until it receives an updated temperature indication in a subsequent control channel message.

4. Exemplary Placement of the Repeater

Figure 6:
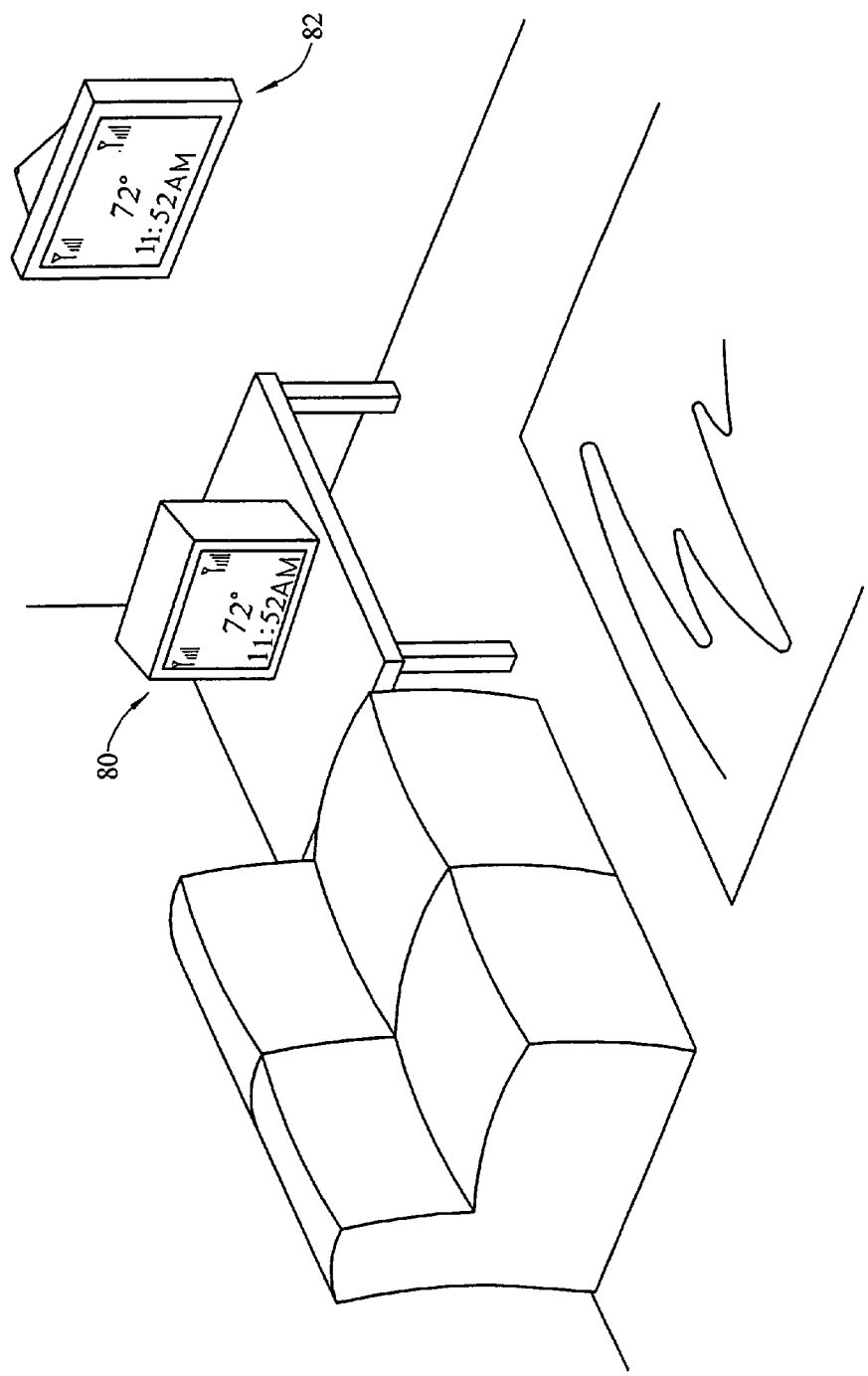
FIG. 6 is an illustration of how the exemplary embodiment repeater could be prominently positioned within a room, to allow easy viewing of outside temperature and local time information.

As noted above, the exemplary embodiment is particularly advantageous, because it takes a device that would normally function to just boost wireless signals, and it makes the device into a more useful object in the eyes of the average lay-person. FIG. 6 depicts how a user might position the exemplary repeater in a home, for instance, to facilitate not only boosting cellular coverage in the home but also display of outside temperature and local time.

As shown in FIG. 6, the repeater 22 could be positioned on an end-table in the manner designated by reference numeral 80. Alternatively, the repeater 22 could be equipped with picture wire or a bracket and hung on a wall in the manner designated by reference numeral 82. With either of these or other arrangements, a person in the room where the repeater is positioned could conveniently look at the repeater to determine the current outside temperature and local time.

5. Selective Display on the Repeater

In accordance with the exemplary embodiment, repeater 22 could be configured to allow a user to select what information should be presented on display 50. For instance, through a basic on-screen menu system and buttons on the surface of the repeater, controller 126 could allow a user to select whether the repeater should display (i) signal-level information, (ii) outside temperature, (iii) local time, and/or any combination of these or other available pieces of information. The repeater would then display the selected information for viewing.

6. Conclusion

An exemplary embodiment of the present invention has been described above. Those skilled in the art will understand, however, that changes and modifications may be made to this embodiment without departing from the true scope and spirit of the present invention, which is defined by the claims.

For example, although the foregoing description focuses mainly on visual display of regional and signal-level information, an exemplary repeater could just as well present the information audibly, such as through an integrated loudspeaker, or by sending an audio signal via suitable output leads to an external loudspeaker. Further, the repeater could output regional and signal-level information for presentation on an external display screen.

Other examples are possible as well.

What is claimed is:

1. An apparatus comprising:
    means for wirelessly receiving a signal transmitted from a cellular base station, amplifying the signal, and wirelessly transmitting the signal once amplified;
    means for extracting regional information from the signal;
    means for presenting the regional information to a user; and
    an apparatus housing that houses the means for wirelessly receiving, the means for extracting, and the means for presenting,
    wherein the signal that is wirelessly received, amplified and wirelessly transmitted by the apparatus is the signal from which the apparatus extracts the regional information for presentation by the apparatus to the user.

2. The apparatus of claim 1, wherein the regional information comprises an indication of outside temperature.

3. The apparatus of claim 2, wherein the regional information further comprises an indication of local time.

4. The apparatus of claim 1, wherein the means for presenting also presents an indication of signal-level to the user.

5. The apparatus of claim 4, wherein the means for presenting presents the indication of signal-level concurrently with the regional information.

6. The apparatus of claim 1, wherein the means for presenting comprises a display screen.

7. The apparatus of claim 1, wherein the means for presenting comprises an audio output means.

8. The apparatus of claim 1, wherein the means for wirelessly receiving a signal, amplifying the signal, and wirelessly transmitting the signal once amplified comprises:
    at least one antenna; and
    a filter to block from the signal substantially all but a predefined frequency range selected from the group consisting of (i) about 1930 to 1990 MHz and (ii) about 1840 to 1870 MHz.

9. The apparatus of claim 1, further comprising means for mounting the apparatus.

10. A wireless signal repeater arranged to display outside temperature, the wireless signal repeater comprising a repeater housing that houses:
    an input circuit for wirelessly receiving a signal transmitted from a cellular base station;
    a build-out circuit for amplifying the signal;
    an output circuit for wirelessly transmitting the signal once amplified;
    a display, wherein the display faces out from an outer surface of the repeater housing so as to allow user-viewing of indications presented on the display;
    a cellular receiver for extracting a control channel from the signal; and
    logic for reading from the control channel an indication of outside temperature and for causing the outside temperature to be presented on the display for viewing by a user,
    whereby the signal that is wirelessly received, amplified and wirelessly transmitted by the wireless repeater is the signal from which the wireless repeater obtains the regional information for presentation on the display to the user.

11. The wireless signal repeater of claim 10, wherein the cellular receiver comprises a rake receiver.

12. The wireless signal repeater of claim 10, wherein the input circuit wirelessly receives the signal from a cellular base station.

13. The wireless signal repeater of claim 10, wherein the logic further reads from the control channel an indication of local time and causes the local time to be displayed for viewing by the user.

14. The wireless signal repeater of claim 13, wherein the logic causes the local time to be displayed concurrently with the outside temperature.

15. The wireless signal repeater of claim 10, wherein the logic is embodied as a processor programmed with machine language instructions.

16. A method comprising:
    wirelessly receiving a signal at an apparatus, wherein the apparatus comprises an apparatus-housing that houses (i) a build-out circuit, (ii) control-logic, and (iii) a display, and wherein the display faces out from an outer surface of the housing so as to allow user-viewing of indications that are displayed on the display, wherein the received signal is originated wirelessly from a cellular base station;
    using the build-out circuit to amplify the signal, and wirelessly transmitting the amplified signal from the apparatus;
    using the control-logic to obtain from the signal an indication of outside temperature; and
    presenting the indication of outside temperature on the display, for viewing by a user,
    wherein the signal that is wirelessly received, amplified and wirelessly transmitted by the apparatus is the signal from which the apparatus extracts the indication of outside temperature for presentation by the apparatus on the display.

17. The method of claim 16, further comprising:
    using the control-logic to obtain from the signal an indication of local time; and
    presenting the indication of local time on the display, for viewing by the user.

18. The method of claim 17, further comprising:
    concurrently presenting to the user both the indication of local time and the indication of outside temperature.

19. The method of claim 16, further comprising:
    concurrently presenting to the user both the indication of outside temperature and an indication of signal level.

20. A method of reporting outside temperature, the method comprising:
    establishing a digital representation of an outside temperature for a cell site served by a base station, wherein establishing the digital representation of an outside temperature for the cell site served by the base station comprises operating a temperature source mounted on an antenna tower of the base station to measure the outside temperature at the base station;

inserting the digital representation of the outside temperature as a predetermined parameter in a control channel message;

broadcasting the control channel message from the base station;

receiving the control channel message at a wireless signal repeater; and executing logic in the wireless signal repeater to read the digital representation of the outside temperature from the predetermined parameter in the control channel message and to display the outside temperature indicated by the digital representation, wherein the wireless signal repeater comprises a repeater housing, wherein the receiving and executing functions are carried out within the repeater housing, and wherein the display faces out from an outer surface of the repeater housing to allow a user to view indications on the display.

21. The method of claim 20, wherein the temperature source comprises a platinum resistance temperature detector.

* * * * *